United States Patent [19]

Shibata et al.

[11] 3,719,881

[45] March 6, 1973

[54] DEVICE FOR CHARGING STORAGE BATTERY

[75] Inventors: Takanori Shibata; Ryoji Kasama; Shotaro Naito, all of Katsuta; Shin Maii, Tokyo, all of Japan

[73] Assignees: Nissan Motor Co., Ltd., Yokohama-shi; Hitachi, Ltd., Chiyoda-ku, Tokyo, both of Japan

[22] Filed: Dec. 10, 1970

[21] Appl. No.: 96,935

[30] Foreign Application Priority Data

Dec. 12, 1969 Japan..............................44/99430

[52] U.S. Cl. ..................320/62, 180/65, 290/17, 290/50, 322/38
[51] Int. Cl. ...........................................H02j 7/32
[58] Field of Search ......320/64, 68, 62, 61; 318/139; 290/10, 14, 17, 50; 180/6.5; 322/10, 11

[56] References Cited

UNITED STATES PATENTS

| | | | |
|---|---|---|---|
| 1,582,825 | 4/1926 | Kellogg | 290/50 X |
| 3,477,009 | 11/1969 | Nichols | 320/39 X |
| 1,705,673 | 3/1929 | Menzies | 290/50 |
| 2,314,687 | 3/1943 | Carlson | 290/50 |
| 2,813,984 | 11/1957 | Dolecki et al. | 290/17 X |
| 1,817,378 | 8/1931 | Juergens | 320/68 X |
| 3,517,766 | 6/1970 | West | 290/16 X |
| 3,525,874 | 8/1970 | Toy | 318/139 X |
| 3,566,717 | 3/1971 | Berman et al. | 290/14 X |

Primary Examiner—J. D. Miller
Assistant Examiner—Robert J. Hickey
Attorney—Craig, Antonelli & Hill

[57] ABSTRACT

Battery charger comprising means for detecting the specific gravity of the electrolyte of the battery and for closing the ignition and starter circuits of the internal combustion engine when the detected specific gravity is below a prescribed value, and thus starting said internal combustion engine which drives the generator for charging the battery; a switch for disabling said starter when the internal combustion engine rotates at a speed higher than its starting rotation speed; a device for automatically controlling the throttle valve of said internal combustion engine for the purpose of keeping the rotation speed of the internal combustion engine at a predetermined value; and a switch for detecting the load of the internal combustion engine and for disabling the ignition when the detected load falls below a predetermined value; thus, the battery charger makes it possible to maintain the internal combustion engine to be operated under an intermediate load condition and to reduce the amount of harmful contents in the exhaust gas.

17 Claims, 1 Drawing Figure

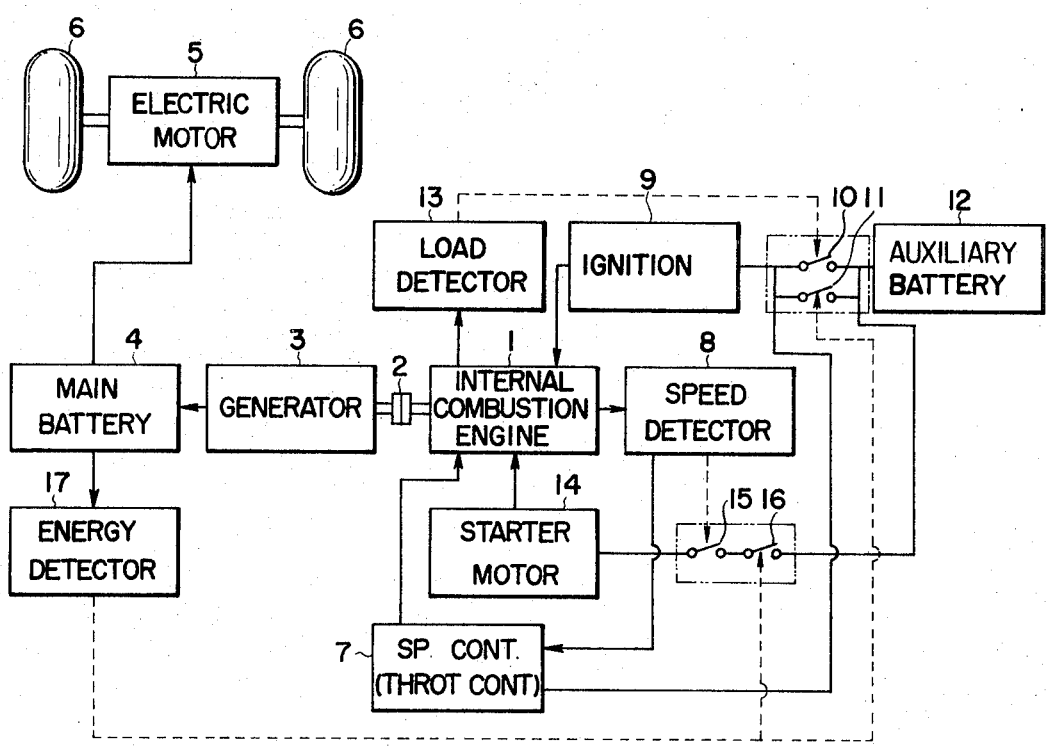

DEVICE FOR CHARGING STORAGE BATTERY

BACKGROUND OF THE INVENTION

This invention relates to battery chargers, and more particularly to a charger for automatically operating the internal combustion engine provided for charging the battery under the condition that the amount of harmful components contained in the exhaust gas is reduced.

The generally known battery charger is arranged such that the battery is charged from the generator driven by the internal combustion engine. In an electric motorcar, for example, it is known that a charger is used in combination with an internal combustion engine to charge the battery. According to the prior art, however, no system has been proposed which provides a charger capable of automatically operating the internal combustion engine arranged to drive the generator for charging the battery under conditions where the amount of harmful components in the exhaust gas of the engine is reduced.

SUMMARY OF THE INVENTION

It is an object of this invention to provide a battery charger capable of operating the internal combustion engine which is arranged to drive the generator for charging the battery with a reduced amount of harmful components in the exhaust gas.

It is another object of this invention to provide an automatic device for detecting the energy stored in the battery and for charging the battery by automatically starting the internal combustion engine when the detected energy is below a certain specific value.

It is still another object of this invention to provide an automatic device for detecting the level to which the battery has been charged and for automatically stopping the internal combustion engine when the detected degree of charge comes to a value at which the internal combustion engine is rotated under a light load condition and the amount of harmful exhaust gas components is increased.

More specific objects, features and advantages of the invention will appear from the description given below.

The battery charger of this invention is characterized in that it is provided in combination with an internal combustion engine which drives the generator for charging the battery, the energy stored in the battery is detected, the internal combustion engine is started when the detected energy falls below a certain specific value, and the internal combustion engine is stopped when the load of the internal combustion engine in operation becomes light and the amount of harmful exhaust gas components is increased.

This invention will be better understood from the following description taken in connection with the accompanying drawing, which is a block diagram of a battery charging system for a motor vehicle.

DETAILED DESCRIPTION OF THE INVENTION

Referring to the drawing, there is shown a battery charger in accordance with this invention, wherein an internal combustion engine 1 is provided to drive a d.c. generator 3 by way of a coupling means 2, such as a standard belt connection. It is desirable that the d.c. generator 3 comprise an a.c. generator and a semiconductor rectifier circuit; however, other combinations are obviously also acceptable. The d.c. output of the generator 3 is connected to charge the battery 4. An electric motor 5 is energized by the battery 4 to drive the wheels 6 of the vehicle.

The opening of a throttle valve (not shown) for controlling the speed of rotation of the internal combustion engine 1 is controlled by a rotation speed controller 7 so that the electrical output of a rotation speed detector 8 driven by the internal combustion engine is kept constant. From an electrical standpoint, it is desirable that a tachogenerator be used for the rotation speed detector 8, although other equivalent devices and arrangements are also suitable. The rotation speed controller 7 is a generally well known servo device wherein the voltage generated in the tachogenerator 8 is compared with a reference voltage corresponding to a certain specific rotation speed, and a reversible motor is operated by the difference signal, thereby adjusting the throttle valve opening to meet the characteristics under which the difference between said two voltages becomes zero, thereby forming a servo loop.

The reference numeral 9 denotes an internal combustion engine ignition circuit. The power input terminal of this ignition circuit 9 and also the power input terminal of said rotation speed controller 7 are connected to an auxiliary battery 12 by way of parallel switches 10 and 11. A load detector 13 is operated so as to close said switch 10 when the load is more than a predetermined value (namely, in the operating region of the engine in which the amount of harmful exhaust gas is small). In practice, the switch 10 is closed by the load detector 13 when the opening of the throttle valve exceeds a certain definite value. Thus, the load detector 13 may comprise a simple lost motion linkage connection for closing a switch in a relay circuit, including the relay associated with switch 10, when the throttle valve of the engine opens beyond a certain point, for example. Of course, other equivalent arrangements would also be equally suitable to perform the same function.

An internal combustion engine starter 14 comprising a starter motor is connected to said auxiliary power source 12 by way of serial switches 15 and 16. A detector 17 is provided for detecting the energy stored in the battery 4. This energy detector is operated to close the switches 11 and 16 when the detected energy of the battery falls below a certain specific value. The energy detection is accomplished by a detector electrode immersed in the electrolyte of battery 4, and the voltage produced at this electrode is compared with a reference voltage.

The switch 15 is normally closed and is opened by the speed detector 8 when the rotation speed of the internal combustion engine 1 exceeds its starting rotation speed. Practically speaking, this switch is operated by a relay which is opened by the voltage produced in the rotation speed detector 8.

In the above arrangement, the throttle valve of the internal combustion engine 1 is closed and the switch 10 is opened when the internal combustion engine 1 is not in operation and the energy stored in the battery 4 is more than a certain specific value. In this state, the energy stored in the battery 4 is large and, therefore, the switches 11 and 16 are opened and the switch 15 is closed, and no battery charging is accomplished.

When the energy stored in the battery 4 is consumed or otherwise reduced below a certain specific value, the switches 11 and 16 are closed by the energy detector 17. As a result, the engine ignition circuit 9 is connected to the power source formed by auxiliary battery 12, and the starter motor 14 is energized through closed contacts 15 and 16 to start the internal combustion engine 1. Upon completion of engine start, the rotation speed detector 8 delivers an output voltage, and the switch 15 is opened to de-energize the starter 14. At the same time, the rotation speed controller 7 receives the output voltage of the rotation speed detector 8 and controls the opening of the throttle valve so as to bring the engine up to a constant predetermined speed and maintain this speed. When the internal combustion engine begins its operation, the generator 3 operates to charge the battery 4. By this means, the battery 4 restores its energy and eventually the switches 11 and 16 are opened, when the battery 4 reaches full charge. Since the switch 10 is connected in parallel with the switch 11, the switch 10 is closed at the throttle valve opening corresponding to the region in which the amount of harmful exhaust gas is small. In this state, the internal combustion engine is in operation.

When the battery is further charged, the charging current is reduced even if the voltage generated in the generator 3 is controlled according to the charging characteristic. At the end of charging, the charging current becomes small, the load of the internal combustion engine 1 is reduced, and the throttle valve opening for maintaining a constant rotation speed is reduced. As a result, the amount of harmful exhaust gas components is increased. When the valve opening reaches its minimum value, the load detector 13 operates to open the switch 10 and to de-energize the ignition circuit 9. Thus, the internal combustion engine 1 is stopped. In other words, the internal combustion engine 1 is not operated in the region corresponding to a small valve opening at which the amount of harmful exhaust gas components is large.

Needless to say, the load of the internal combustion engine 1 can be detected also by the output power (load power) of the generator 3; however, it is preferred in accordance with the present invention that the engine be controlled in accordance with the exhaust emission therefrom for obvious reasons.

According to this invention, as has been described, the internal combustion engine which drives the generator for charging the battery is automatically controlled so as to be operated only in the region wherein the amount of harmful components contained in the exhaust gas is small. Hence the battery charger of this invention can be highly effectively used for vehicles such as, for example, a hybrid electric motorcar.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. A battery charger comprising a generator for charging said battery, an internal combustion engine for driving said generator, energy detecting means for detecting the level of charge of said battery, an ignition circuit, an auxiliary battery, a starter motor associated with said internal combustion engine, and switching control means for automatically connecting said ignition circuit and said starter motor to said auxiliary battery in response to said energy detecting means detecting a minimum level of charge of said battery to thereby operate said internal combustion engine, said switching control means including means for automatically de-energizing said ignition circuit in response to reduction of the load of said internal combustion engine below a prescribed level, means for automatically de-energizing said starter motor in response to operation of said internal combustion engine and speed control means connected to said internal combustion engine to maintain the speed thereof at a constant level.

2. A battery charger as defined in claim 1, wherein said speed control means includes speed detector means connected to said engine for generating a speed signal indicative of the speed of rotation of said engine and servo control means for controlling the speed of said engine in response to the relative value of said speed signal with respect to a fixed reference voltage, said servo control means including means to adjust the throttle valve of said engine.

3. A battery charger as defined in claim 3, wherein said switching control means includes load detecting means responsive to operation of the throttle valve of the engine by said speed control means for de-energizing said ignition circuit in response to closure of said throttle valve below a predetermined value.

4. A battery charger as defined in claim 3, wherein said switching control means includes a first normally open switch operable by said energy detecting means for connecting said auxiliary battery to said ignition circuit and said energy detecting means includes a detector electrode immersed in an electrolyte of said battery for detecting the energy level thereof.

5. A battery charger as defined in claim 4, wherein said switching control means includes a second normally open switch operable by said load detecting means upon opening of said throttle valve above said predetermined value for connecting said auxiliary battery to said ignition circuit.

6. A battery charger as defined in claim 5, wherein said switching control means includes third and fourth switches connected in series between said auxiliary battery and said starter motor, said third switch being normally open and operable by said energy detecting means, and fourth switch being normally closed and operable by said speed detector means to de-energize said starter motor when said engine reaches a speed above its starting speed.

7. A battery charger as defined in claim 1, further comprising an electric motor selectively connectable to said battery for operation, said electric motor being in driving connection with the wheels of a vehicle.

8. A battery charger as defined in claim 1, wherein said switching control means includes load detecting means responsive to operation of the throttle valve of the engine by said speed control means for de-energizing said ignition circuit in response to closure of said throttle valve below a predetermined value.

9. A battery charger as defined in claim 1, wherein said switching control means includes a first normally open switch operable in response to said energy detecting means for connecting said auxiliary battery to said ignition circuit and said energy detecting means includes a detector electrode immersed in an electrolyte of said battery for detecting the energy level thereof.

10. A battery charger comprising a generator for charging said battery, an internal combustion engine for driving said generator, throttle valve control means for regulating the speed of said engine to a given speed by adjustment of the position of the throttle valve thereof, an ignition circuit and a starter motor associated with said internal combustion engine, energy detecting means for detecting the charging level of said battery including a detector electrode immersed in the electrolyte of said battery, first switching means for automatically energizing said ignition circuit, said starter motor and said throttle valve control means in response to said energy detecting means when the charging level of said battery falls below a prescribed minimum level, and second switching means for de-energizing said ignition circuit and said throttle valve control means independently of said first switching means when the load of the internal combustion engine is below a certain specific value.

11. A battery charger as defined in claim 11, further including third switching means for disabling said starter motor independently of said first and second switching means when the engine is operated at a speed higher than its starting speed.

12. A battery charger as defined in claim 10, wherein said throttle valve control means includes speed control means connected to said internal combustion engine to maintain the speed thereof at a constant level.

13. A battery charger as defined in claim 12, wherein said speed control means includes speed detector means connected to said engine for generating a speed signal indicative of the speed of rotation of said engine and servo control means for controlling the speed of said engine in response to the relative value of said speed signal with respect to a fixed reference voltage, said servo control means including means to adjust the throttle valve of said engine.

14. A battery charger as defined in claim 12, wherein said second switching means includes load detecting means responsive to operation of the engine throttle valve by said speed control means for de-energizing said ignition circuit in response to closure of said throttle valve below a predetermined value.

15. A battery charger as defined in claim 10, wherein said first switching means is operable by said energy detecting means.

16. A battery charger as defined in claim 15, further including an auxiliary battery, said first switching means including a normally open switch operable by said energy detecting means to connect said auxiliary battery to said ignition circuit.

17. A battery charger as defined in claim 11, further comprising an electric motor selectively connectable to said battery for operation, said electric motor being in driving connection with the wheels of a vehicle.

* * * * *